United States Patent [19]

Nakamura et al.

[11] Patent Number: 5,518,390
[45] Date of Patent: May 21, 1996

[54] SPEED CONTROL UNIT FOR INJECTION MOLDING MACHINES

[75] Inventors: Nobuyuki Nakamura; Masashi Suganuma, both of Nagano, Japan

[73] Assignee: Nissei Plastic Industrial Co., Ltd., Nagano, Japan

[21] Appl. No.: 317,788

[22] Filed: Oct. 4, 1994

[51] Int. Cl.⁶ .................................................. B29C 45/77
[52] U.S. Cl. .......................... 425/145; 264/40.7; 425/149
[58] Field of Search .................................... 425/145, 149; 264/40.7

[56] References Cited

U.S. PATENT DOCUMENTS

| | | | |
|---|---|---|---|
| 3,932,083 | 1/1976 | Boettner | 425/145 |
| 4,411,609 | 10/1983 | Yoshii et al. | 425/149 |
| 5,176,858 | 1/1993 | Tsukabe et al. | 425/149 |
| 5,260,010 | 11/1993 | Yokota | 425/145 |
| 5,425,906 | 6/1995 | Hashimoto | 425/145 |

FOREIGN PATENT DOCUMENTS 62-270803  11/1987  Japan .

*Primary Examiner*—Tim Heitbrink

[57] ABSTRACT

The speed control unit for open loop control of the speed of an actuator 2 of an injection cylinder according to setpoint Vs of speed. The speed control unit includes a measurement sensing unit 3 to detect speed measurement Vd and pressure measurement Pd from the run of the actuator 2. An arithmetic processing unit 4 calculates a correction value Av for command value Vc of speed according to a speed measurement Vd, a pressure measurement Pb, a setpoint Vs of speed and/or a setpoint Ps of pressure, in cases where the speed measurement Vd is found deviated from the setpoint Vs of speed.

9 Claims, 3 Drawing Sheets

SPEED CONTROL UNIT FOR INJECTION MOLDING MACHINES

FIELD OF THE INVENTION

The present invention relates to a speed control unit which is provided for injection molding machines with a view to controlling the running speed of an actuator such as an injection cylinder, and so forth serving to move back and forth the screw.

DESCRIPTION OF THE RELEVANT ART

The hydraulic circuit thus far employed for injection molding machines is disclosed in Japanese Patent Laid-Open Publication No. 62 (1987)-270803. Since the hydraulic circuit therein was devised capable of controlling the discharge flow and discharge pressure of a hydraulic pump by regulating the run thereof, when flow control is under way, feedback control used to be effected through a comparison between a command value of discharge flow and a detected value of discharge flow which is provided by a potentiometer so that the detected value of discharge flow may agree with the command value of discharge flow while, in the pressure control mode, feedback control was likewise implemented via comparing a command value of discharge pressure with a detected value of discharge pressure which is given from a hydraulic sensor, whereby the detected value of discharge pressure may coincides with the command value of discharge pressure.

In the meanwhile, injection molding machines go primarily with either the feedback or the open loop control system applied as a control system for their actuators such as injection cylinders or the like. The feedback control system is characterized by not only a complex system configuration plus a higher cost but also a merit that higher accuracy of control is feasible, for both the running speed and the working pressure of an actuator are directly feedback-controlled, using a servo valve.

On the other hand, the open loop control system is effected as disclosed in said Patent Laid-Open Publication with a command value of speed or pressure fed directly to a servomechanism, whereby actuator pressure and speed are controlled according to each of these-command values, Therefore, the open loop control system renders service, providing feedback control using a minor loop for both the discharge flow and discharge pressure of said hydraulic pump but not providing feedback control for the speed and pressure of an actuator. The open loop control system is inferior to the feedback control system over the accuracy of control but is meritorious in the aspect of a simpler system configuration and a lower cost.

It is noted here that when the open loop control system entails is brought into use, the injection speed of a screw is controlled as being such as specified in FIG. 5 in the injection molding cycle, namely, the injection speed in actual run is so controlled as grasped in speed measurement Vd, nevertheless a constant speed setpoint (command value Vc of selected speed) is selected for the injection speed. And thus, the screw is driven forth at a speed corresponding to speed measurement Vd, with molten plastic getting injected into the cavity within a set of molds, filling it up. On the other hand, with the open loop control system in service, pressure measurement Pd (load pressure) goes up gradually, starting around Xp point at which molten plastic flows through each gate upon its passing through a sprue and runners provided in the molds while at the same time, the flow of hydraulic oil decreases due to the compression which the hydraulic oil undergoes along with this pressure rise, the expansion of a hydraulic piping, and so forth, with a problem thus coming up to the fore, causing the injection speed to fall greatly after Xp point in FIG. 5 from its normal value as with speed measurement Vdr.

It is also noted here that this problem likewise occurs in the open loop control system of such a configuration that a servo motor is applied as a drive source for a hydraulic pump, wherein the running speed of the servo motor declines as the load pressure goes up, with the injection speed getting decreased thereby.

SUMMARY OF THE INVENTION

An object of the present invention is to provide a speed control unit for injection molding machines, which speed control unit is devised with speed fluctuations in the open loop control system eliminated, whereby stabilized, high accuracy of speed control may be achieved and the quality of molded products may also be improved thereby.

To attain this object, the present invention devised such a speed control unit for open-loop controlling the speed of actuator 2 (injection cylinder 2i) in response to setpoint Vs of speed as comprises particularly, measurement sensing member 3 to detect both speed measurement Vd and pressure measurement Pd from the run of actuator 2, arithmetic processing member 4 to calculate through the arithmetic processing such as functional arithmetic operation or fuzzy arithmetic operation, etc., for example, following more than two out of speed measurement Vd, pressure measurement Pd, setpoint Vs of speed or setpoint Ps of pressure correction value Av, for command value Vc of speed in case where speed measurement Vd is found varied in reference to setpoint Vs of speed, correction value memory 5 wherein to store calculated correction value Av, and correcting member 6 to correct command value Vc of speed according to correction value Av when speed measurement Vd is disclosed changed from setpoint Vs of speed in the injection molding cycle.

It is noted here that correction value Av to be calculated via functional arithmetic operation in arithmetic processing member 4 can be obtained according to a functional expression of $Av=[Vs-Vd]+K\times[\Delta Pd/\Delta t]$ (where Vs refers to a setpoint of speed, Vd to a speed measurement, K to a variable coefficient, Pd to pressure measurement, and t to time). Of further note is correcting member 6 which is devised to start a due correction from the injection molding cycle subsequent to the preceding one in which correction value Av has been calculated, and correction value Av which is renewed regularly (every N injection molding cycles) or irregularly (whenever a state of abnormalcy, etc. emerges).

Thus, speed control of actuator 2 becomes basically open loop control. Meanwhile, measurement sensing member 3 detects both speed measurement Vd and pressure measurement Pb in advance from the run of actuator 2, and detected speed measurement Vd and pressure measurement Pb are fed to arithmetic processing member 4. As arithmetic processing member 4 is also fed with setpoint Vs of speed and setpoint Ps of pressure, said arithmetic processing member 4 calculates through functional arithmetic operation or fuzzy arithmetic operation according to more than two out of speed measurement Vd, pressure measurement Pd and setpoint Vs of speed or setpoint Ps pressure correction value Av for command value Vc of speed in case where there is found some deviation of speed measurement Vd from setpoint Vs of speed. Correction value Av thus calculated is then stored in correction value memory 5.

Meanwhile, it is preferable that in the injection molding cycle subsequent to the preceding one in which correction value Av has been calculated, the speed and the pressure of actuator 2 are detected, and whether or not speed measurement Vd has deviated from setpoint Vs of speed is monitored. When speed measurement Vd is found deviated from setpoint Vs of speed, correction value Av read out from memory 5 is fed to correcting member 6, wherein command value Vc of speed is corrected following correction value Av, whereby the deviation of speed measurement Vd from the setpoint is suppressed, with high accuracy of speed control ensured thereby.

DETAILED DESCRIPTION OF THE PREFERRED EMBODIMENTS

Next, one of the preferred embodiments of the present invention is quoted hereunder and described in detail with reference to the accompanying drawings.

Figure 1:
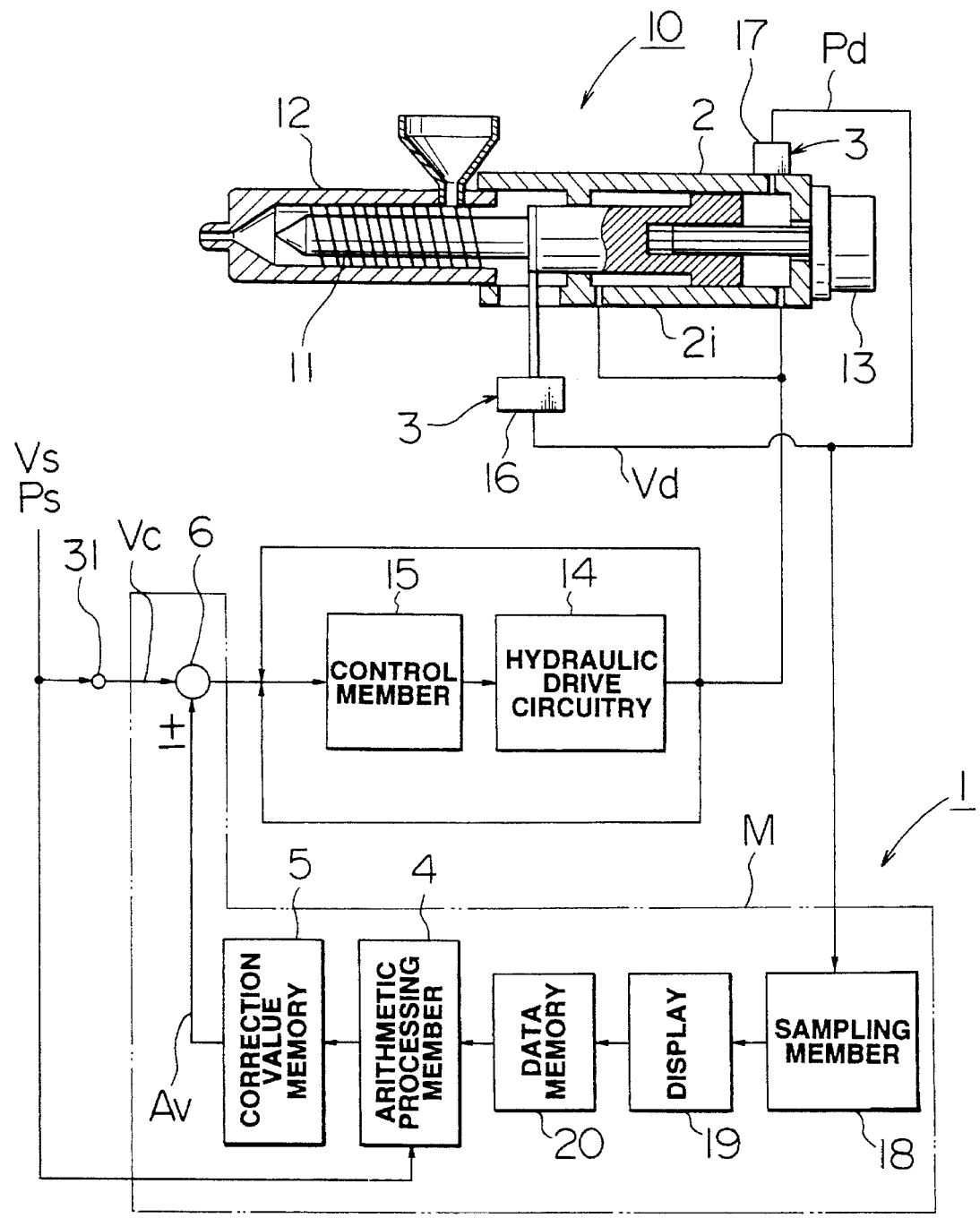
FIG. 1 is a block circuit diagram of the speed control unit to which the present invention relates.
Figure 2:
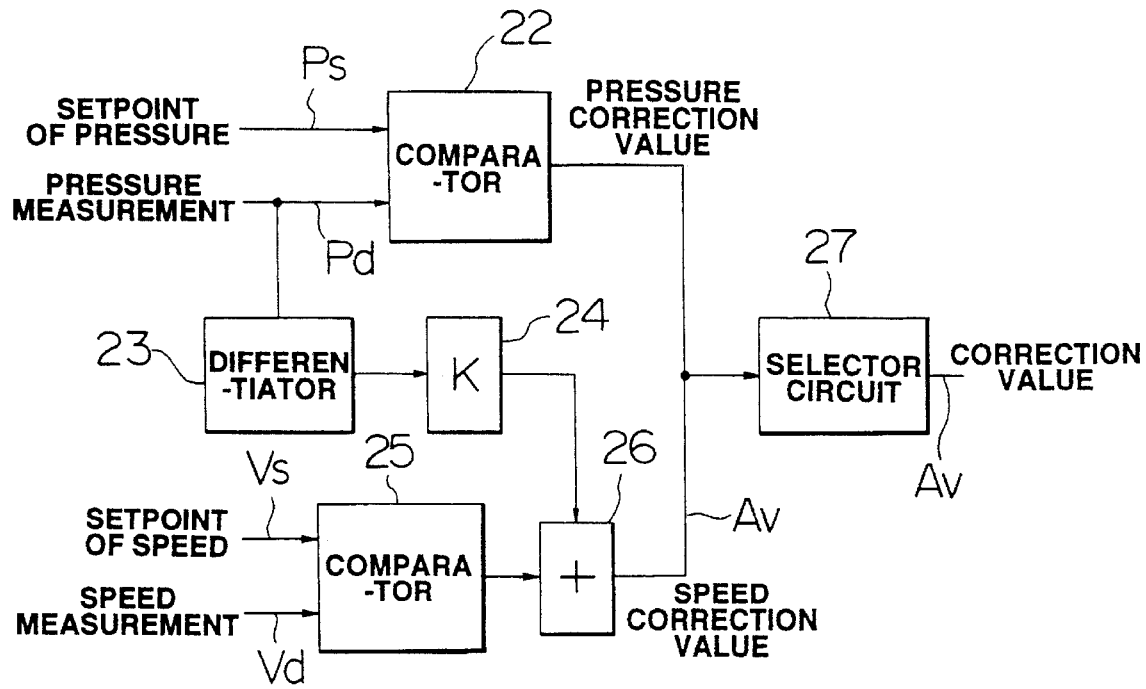
FIG. 2 is a block circuit diagram of the arithmetic processing member included in said speed control unit.

First, the constitution of speed control unit 1 which is provided for an injection molding machine and relative of this embodiment is described, referring to FIGS. 1 and 2.

In FIG. 1, 10 refers to an injection unit of the injection molding machine, which injection unit includes injection cylinder 2$i$ (actuator 2) to move back and forth screw 11 incorporated in barrel cylinder 12, and oil motor to turn screw 11. To injection cylinder 2$i$ (and oil motor 13), hydraulic drive circuit 14 including a control valve, a variable displacement type hydraulic pump, and so forth is connected.

Also to hydraulic drive circuit 14, control member 15 is coupled to which a detected discharge flow and discharge pressure of the hydraulic pump in hydraulic drive circuit 14 are fed back, whereby a minor loop-applied feedback control system is formed, under which normally, setpoint Vs of speed selected for injection speed and setpoint Ps of pressure chosen for load pressure are fed to control member 15.

Now, according to the present invention, speed control unit 1 is provided, which is furnished with speed sensor 16 to detect the forward speed, namely the injection speed of screw 11 which is driven back and forth by injection cylinder 2$i$ and pressure sensor 17 to detect the load pressure at injection cylinder 2$i$. In this case, speed sensor comprised of a position sensor; the screw speed is provided through differentiating the detected positional consequence therefrom by the time up to the point where the screw position has been detected.

The respective consequences of detection by speed sensor 16 and pressure sensor 17 are fed to operation monitor M which includes sampling member 18, display 19, data memory 20, arithmetic processing member 4, correction value memory 5, and correcting member 6. In this case, speed sensor 16, pressure sensor 17 and sampling member 18 forms measurement sensing member 3 which provides speed (injection speed) measurement Vd and pressure (load pressure) measurement Pb. Arithmetic processing member 4 has an arithmetic processing function to calculate, following more than one or two out of speed measurement Vd, pressure measurement Pd, setpoint Vs of speed and setpoint Ps of pressure correction value Av for command value Vc of speed when speed measurement Vd is found deviated from setpoint Vs of speed, namely, correction value Av for due correction to eliminate the deviation of speed measurement Vd from setpoint Vs of speed, wherein the functional arithmetic processing is executed in the control unit illustrated in the block circuit diagram in FIG. 2.

With reference to FIG. 2, 22 refers to a comparator to compare setpoint Ps of pressure with pressure measurement Pd, 23 to differentiator to differentiate pressure measurement Pd, 24 to a coefficient selector to set variable coefficient K (0–10 for example), 25 to a comparator to compare setpoint Vs of speed with speed measurement Vd, 26 to an adder, and 27 to a selector circuit.

Figure 3:
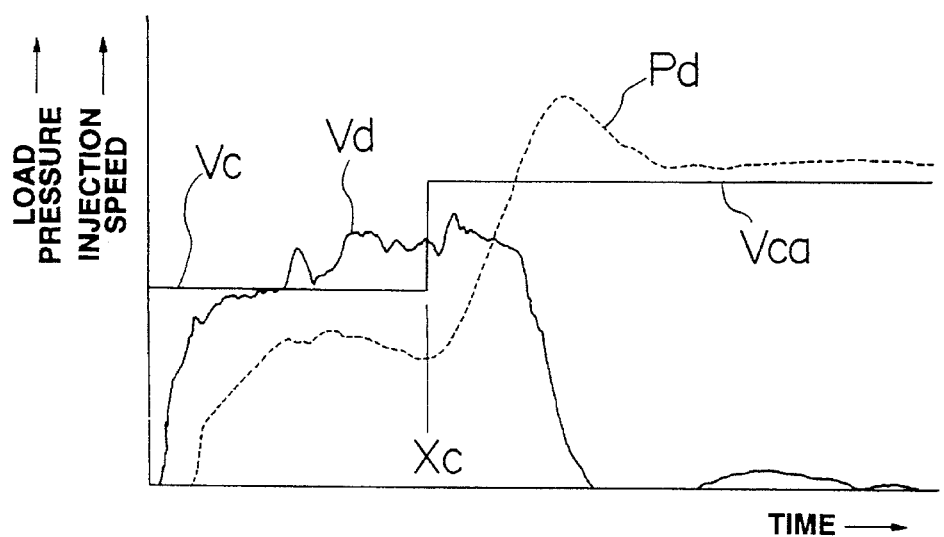
FIG. 3 is a graph of the injection speed and load pressure characteristics which an injection molding machine installed with said speed control unit exhibits in the progress of time during the run.

Next, how speed control unit 1 with which the method of speed control to which the present invention relates is concerned, functions is illustrated hereunder with reference to FIGS. 1 through 3. The entry of setpoint Vs of speed and setpoint Ps of pressure via input member 31 causes control member 15 to control hydraulic drive circuit 14, with injection cylinder 2$i$ (actuator 2) getting driven according to the open loop control.

On the other hand, both the injection speed and the load pressure at injection cylinder 2$i$ are detected respectively by speed sensor 16 and pressure sensor 17, and from sampling member 18, speed measurement Vd and pressure measurement Pb are provided, which are then presented on display 19, followed by being not only stored in data memory 20 but also filed, analyzed, etc. as occasion demands. Meanwhile, speed measurement Vd and pressure measurement Pd thus provided are then fed to arithmetic processing member 4. Arithmetic processing member 4 calculates, through functional arithmetic operation, following speed measurement Vd, pressure measurement Pb, setpoint Vs of speed and setpoint Ps of pressure which have been input, correction value Av for command value Vc of speed for due correction to eliminate the deviation of speed measurement Vd from setpoint Vs of speed.

Next, the arithmetic function of arithmetic processing member 4 is described in details with reference to FIG. 2. Normally, a fall of the injection speed (speed measurement Vd) causes an abrupt change of the load pressure (pressure measurement Pd). As in the foregoing, since there exists an interrelation (functional relation) between load pressure and injection speed, a correction value can be calculated on the basis of load pressure. Therefore, pressure measurement Pd is first differentiated by differentiator 23 to calculate $\Delta Pd/\Delta t$. The consequence of this differentiation is fed to coefficient selector 24 by which coefficient K has been selected so that the consequence of differentiation may be multiplied by coefficient K, whereby K ($\Delta Pd/\Delta t$) is provided from the output of coefficient selector 24. In the meanwhile, via comparator 25, deviation e (=Vs−Vd) of speed measurement Vd from setpoint Vs of speed is provided, and adder 26 sums up said deviation e and the output from coefficient selector 24, whereby correction value Av for the injection speed, namely, Av= e+K° (ΔPd/Δt) is provided, with this correction value Av getting then output through selector circuit 27. Correction value Av which is output from arithmetic processing member 4 is stored in correction value memory 5. A correction value of pressure is figured out from comparator 22 according to the deviation of pressure measurement Pd from setpoint Ps of pressure, followed by being selectively output from selector circuit 27.

Figure 5:
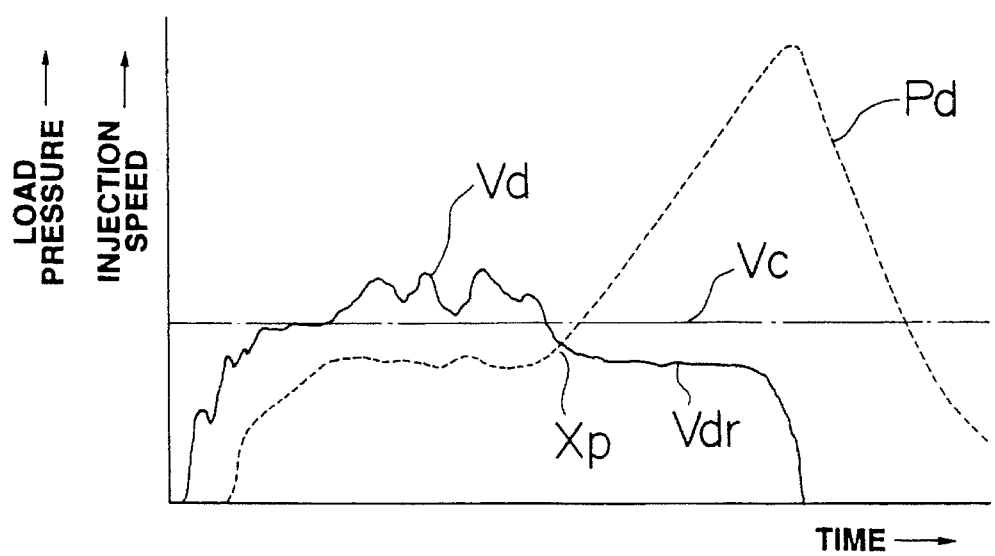
FIG. 5 is a graph of the injection speed and load pressure characteristics which an injection molding machine devoid of said speed control unit exhibits in the progress of time during the run.

On the other hand, in the injection molding cycle succeeding to the former one during which correction value Av has been calculated, the screw speed and the injection pressure are detected from the run of actuator 2, whereby whether or not speed measurement Vd has some deviation from setpoint Vs of speed is monitored. When speed measurement is found deviated from setpoint Vs of speed, correction value Av read out from memory 5 is fed to correcting member 6 wherein command value Vc of speed is corrected according to correction value Av. Shown in FIG. 3 is how this correction serves for high accuracy of control. With reference to said figure, Xc is the point of correction, where the deviation of initialized command value Vc of speed is detected which is subsequently corrected according to correction value Av, with corrected new command value Vca of speed selected, whereby corrected command value Vca of speed serves to maintain speed measurement Vd unchanged at such a magnitude as corresponds to setpoint Vs of speed without subjecting said speed measurement to a decrease, provided where command value Vc of speed is not corrected, speed measurement Vd undergoes a large fall (see Vdr in FIG. 5).

The result is that speed measurement Vd is suppressed from incurring a deviation, whereby high accuracy speed control is assured, and in addition, correction value Av is renewed regularly (every N injection molding cycles) or irregularly (whenever a state of abnormalcy, etc. emerges).

Figure 4:
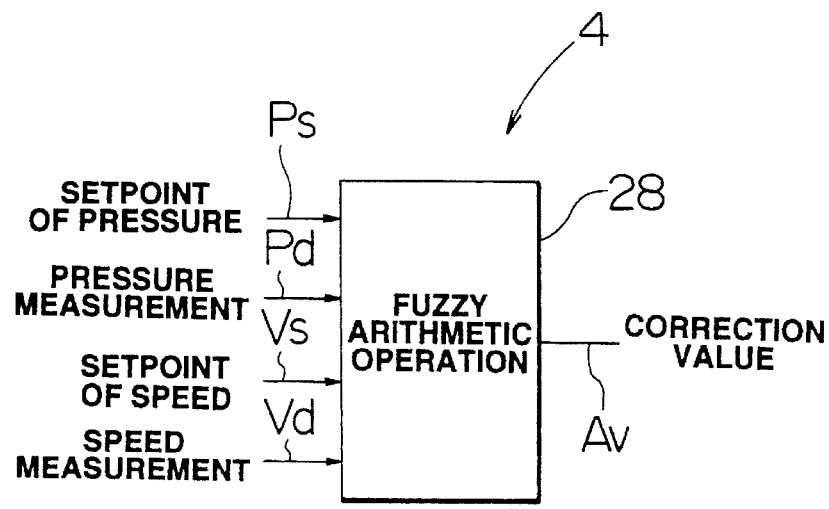
FIG. 4 is a block circuit diagram of another embodiment of the arithmetic processing member included in said speed control unit.

Another embodiment of the present invention is described with reference to FIG. 4 In this embodiment presented in said figure, fuzzy arithmetic operation takes the place of arithmetic operation which arithmetic processing member 4 undertakes. Therefore, as shown in FIG. 4, arithmetic processing member 4 is provided 28. With setpoint Vs of speed, speed measurement (injection speed) Vd, setpoint Ps of pressure, and pressure measurement Pd (load pressure) input to fuzzy arithmetic processing member 28, a fuzzy arithmetic function works, calculating the deviation, change, etc. of each of input speed measurement Vd and input pressure Pb in reference to respectively input setpoint Vs of speed and setpoint Ps of pressure and generating a membership function. The fuzzy arithmetic processing member then makes up a certain rule following the membership function and proceeds with a fuzzy reasoning, using the maximum/minimum principle or the like, whereby correction value Av may be provided.

Some of the preferred embodiments of the present invention have been described in detail in the foregoing but it should be understood that the present invention is by no means limited only to these embodiments. In the description above, a case of controlling the run of an injection cylinder is exemplified. However, the present invention may likewise be embodied to control the operation of a servo motor-driven type injection molding machine, in addition to the run of other actuators such as a mold clamping cylinder. Further, the constitutional particulars, the embodiment methodic details, etc. of the present invention may be modified or altered optionally within the spirit and scope of the present invention.

We claim:

1. A speed control unit for open loop speed control of an actuator of an injection molding machine, said actuator including a movable screw, said speed control unit comprising:

a speed sensor for detecting a forward speed of said screw;

a pressure sensor for detecting a driving pressure exerted on said screw;

arithmetic processing means for calculating a speed correction value based upon measurements received from both said speed sensor and said pressure sensor;

a memory unit for storing a speed correction value calculated by said arithmetic processing means; and correcting means for correcting a command speed value according to a speed correction value calculated by said arithmetic processing means.

2. The speed control unit according to claim 1, wherein the actuator is an injection cylinder.

3. The speed control unit according to claim 1, wherein said arithmetic processing means calculates a speed correction value through a functional arithmetic operation.

4. The speed control unit according to claim 3, wherein a speed correction value Av is calculated according to a functional expression of Av=[Vs−Vd]+K×[ΔPd/Δt] (where Vs=a setpoint of speed; Bd=a speed measurement; K=a coefficient; Pd=a pressure measurement; and t=time).

5. The speed control unit according to claim 4, wherein the coefficient K is changeable.

6. The speed control unit according to claim 1, wherein said arithmetic processing means executes a fuzzy arithmetic operation.

7. The speed control unit according to claim 1, wherein said correcting means executes a correction in the injection molding cycle subsequent to the former one during which a speed correction value has been calculated.

8. The speed control unit according to claim 1, wherein said speed correction value is renewed regularly.

9. The speed control unit according to claim 1, wherein said speed correction value is renewed irregularly.

* * * * *